United States Patent [19]
Weidner

[11] 3,725,642
[45] Apr. 3, 1973

[54] ELECTRIC COFFEE MAKER HAVING A PLASTIC HEATING VESSEL

[75] Inventor: Jack E. Weidner, Milwaukee, Wis.

[73] Assignee: Oster Corporation, Milwaukee, Wis.

[22] Filed: July 10, 1972

[21] Appl. No.: 269,925

[52] U.S. Cl. ................... 219/441, 99/281, 219/433
[51] Int. Cl. ............................................ F27d 11/02
[58] Field of Search ..99/281, 382, 385; 99/281, 382, 99/385

[56] References Cited

UNITED STATES PATENTS

| | | | |
|---|---|---|---|
| 3,138,698 | 6/1964 | Wells et al. | 219/441 |
| 3,226,528 | 12/1965 | Martin | 219/441 |
| 3,392,662 | 7/1968 | Schwartz, Jr. | 99/285 |
| 3,513,295 | 5/1970 | Knowles | 219/442 X |
| 3,678,246 | 7/1972 | Blachly et al. | 219/441 X |
| 3,513,295 | 5/1970 | Knowles | 219/442 X |
| 3,678,246 | 7/1972 | Blachly et al. | 219/441 X |

Primary Examiner—Volodymyr Y. Mayewsky
Attorney—George R. Clark

[57] ABSTRACT

An electric percolator is disclosed having a plastic heating vessel, a plastic base and a heating assembly with a pump well which extends upwardly into the vessel through an aperture in the bottom of the vessel. threaded heating assembly is held in place against the plastic bottom of the heating vessel by a mounting nut. The p plastic of the coffee maker is supported against the bottom of the plastic heating vessel by a metal bracket which has two arms that are secured to the base by screws and which has an aperture that surrounds surrounds upperwardly upwardly pump well and by a plurality of support posts which are integrally molded with the base.

10 Claims, 4 Drawing Figures

PATENTED APR 3 1973 3,725,642

ELECTRIC COFFEE MAKER HAVING A PLASTIC HEATING VESSEL

BACKGROUND OF THE INVENTION

The present invention relates to an electric coffee maker and particularly to an electric percolator having a plastic heating vessel.

Although plastics have achieved widespread use in recent years, there has been only limited use of plastics in connection with electric cooking and heating appliances. While plastic has been very suitable for use in knobs, bases, handles, supports, and the like, there have been problems encountered in attempting to support electrical heating assemblies on plastic vessels. There have been many complex solutions to these problems involving the use of element mounting plates of metal which assist in distributing the heat, and other approaches of this type. In this connection, the patent to Wells U.S. Pat. No. 3,319,048 is noted as disclosing one such solution. The Wells patent also includes a discussion of other prior art approaches to these problems.

In making an electric coffee maker or liquid heating vessel using plastic, a major problem is the mounting of the heating assembly in such a way as to minimize the heat transfer to the plastic and the mounting of the thermostatic controls in such a way that the liquid contents of the plastic vessel may be accurately sensed for control purposes. With respect to the first of these objectives, not only is there a danger that the heating assembly itself will damage the plastic, but there is also a danger of the heating assembly generating substantial amounts of heat in the base or control area of the appliance so as to present additional problems in the operation of the thermostatic controls.

Since the walls of a plastic vessel are insulating in character, it is difficult to sense the temperature of the liquid, such liquid temperature sensing being necessary for the purpose of controlling the energization of the electric heating elements. In a metallic vessel, the thermostat need only be placed against the wall of the vessel to accurately sense the temperature of the contents. Because of the insulating character of the plastic, however, it has been found that in following the same approach in a plastic vessel the response is too slow to be considered adequate. Two prior art patents dealing with this problem of thermostat placement in a plastic vessel appliance are Wells U.S. Pat. No. 3,277,277 and Wheeler U.S. Pat. No. 3,369,105. The plastic vessel appliance of the Wheeler patent has a metal bottom, rather than a plastic bottom, and the heating assembly of this appliance is in direct contact with the metal base.

Another problem involves the location and placement of a fuse or safety thermostat to prevent overheating of the element in the vessel in the event that the liquid is poured out. Again, the plastic vessel presents difficulties in sensing the heat rise in the vessel when the water is poured from the vessel. By the time the heat rise could be satisfactorily sensed through the plastic, the portion of the vessel around the heating element would have already been severly damaged. Accordingly, the safety thermostat must be positioned in such a way that it will respond quickly to the temperature elevation which results from the water or liquid being removed from the vessel.

In the coffee maker of the present invention the vessel portion of the appliance is constructed entirely of plastic. The heating elements are sheathed and cast into the heating assembly which is mounted below the bottom wall of the vessel. The heating assembly has an integral percolator pump well which extends upwardly through an aperture in the plastic bottom wall into the vessel. The heating assembly is thermally insulated from the plastic bottom wall of the heating vessel.

Enclosed within the base compartment is a control thermostat which is mounted in a hole in the bottom wall of the plastic vessel with the upper portion of the thermostat is in contact with the liquid in the vessel so that the thermostat will accurately sense the temperature of the liquid within the vessel. Also positioned within the base compartment is a safety thermostat which is mounted directly on the cast body section of the heater assembly. A single bracket is employed which retains both the control and the safety thermostats in position.

A plastic vessel coffee maker having a somewhat similar construction is described in copending patent application Ser. No. 48,978 filed June 24, 1970 by Donald L. Blachly and Jack E. Weidner, which is assigned to the assignee of the present invention. In the liquid heating vessel of the Blachly et al application, the bottom of the plastic heating vessel was provided with a pair of integrally molded downwardly extending bosses. The base of the Blachly et al heating appliance was secured to the bottom of the plastic heating vessel by means of a pair of screws which passed through a pair of tubular sections on the base into threaded engagement with the bosses on the bottom of the plastic heating vessel. One of the major problems of such a construction is that the bosses may create molded-in stresses in the heating vessel and at elevated temperatures the plastic in the heating vessel would then tend to undergo deterioration due to the molded-in stresses. Therefore, to have the percolator last for any reasonably length of time it is essential to hold molded-in stresses and external stresses to a minimum.

Another construction that has been used involves the use of a single screw in the center of a base of the coffee maker which is screwed into the bottom of the diecast heating assembly in a manner similar to that shown in the aforementioned Wheeler patent. With this arrangement, however, the lower base or the skirt of the coffee maker is put into compression and there is a tendency to force the heating assembly downward which puts an undue stress on the control aperture of the plastic vessel through which the pump well extends.

In the coffee maker of the present invention a base which is similar to the base of the Blachly et al coffee maker is employed. The base, however, has been modified by the addition of four integrally molded upwardly projecting posts which abut against the bottom of the plastic vessel to help to support the bottom of the plastic vessel. A bracket having a circular central section with a central aperture therein is inserted over the upwardly projecting percolator pump well of the heating assembly. The bracket has a pair of arms which extend outwardly over the tubular sections that are integrally formed in the base and the bracket is secured to the base by screws which pass upwardly through the tubular sections. An insulating washer is provided between the bracket and the heating assembly. Both the washer and the bracket have small cut-out portions on their peripheries which are shaped to fit conform to an overlapping peripherical portion of outer surface of the control thermostat. The central aperture of the bracket has a number of triangular-shaped, inwardly projecting elements that help to reduce to sloppiness of the fit of the central aperture, while at the same time providing for a sufficiently large central aperture that the bracket may be easily removed from, and placed over, the percolator pump well.

When the threaded heating assembly is secured to the bottom of the plastic vessel by means of the large locking nut on the inside of the bottom wall of the plastic heating vessel the bracket will be compressibly forcing the bracket upwardly against the bottom wall of the vessel and the base will then be locked into place, with the upstanding support posts on the base helping to support the bottom wall of the plastic vessel. The arms of the mounting bracket are resilient, and thus, the pressure that is provided on the bottom of the plastic vessel can be controlled by controlling the heigth and the material thickness of the arms. The bracket also act as a heat conductor which pulls some heat out of the central area of the plastic vessel to assist in providing a more equal distribution of the heat on the bottom of the plastic vessel.

It is therefore an object of the present to provide a means for securing the base of an electric heating appliance to a plastic upper vessel in a manner which reduces molded-in stresses.

It is another object of the present invention to provide a means for securing the base of an electric heating appliance to a plastic upper vessel in a manner which provides for a more equal distribution of heat on the bottom of the plastic vessel.

It is an additional object of the present invention to provide an electric coffee percolator having a plastic upper vessel and a plastic base which houses a heating assembly that includes an upstanding percolator pump well which projects through an aperture in the bottom of the upper vessel, wherein the base is secured to the upper vessel by means of a metallic bracket which has a central aperture that encircles the percolator pump well and which has a pair of outwardly extending resilient mounting arms that are secured to the base by securing members that pass through tubular sections that are integrally molded with the base, the base also preferably having a plurality of integrally molded upstanding projections which help to support the bottom of the plastic vessel.

DESCRIPTION OF THE DRAWING

For a better understanding of the present invention, reference may be had to the accompanying drawings in which.

TECHNICAL DESCRIPTION OF THE INVENTION

Figure 1:
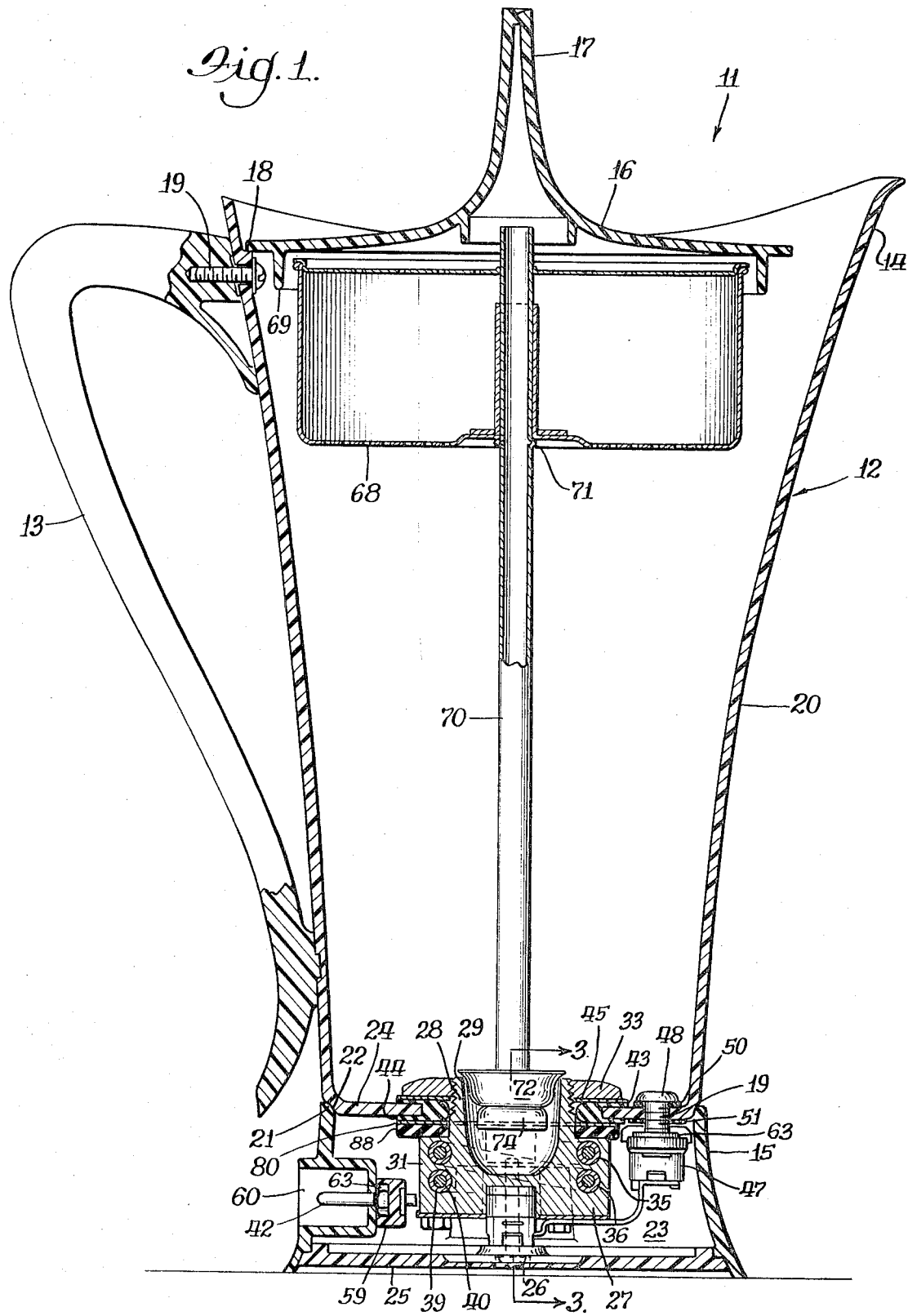
FIG. 1 is a side sectional view of the electric coffee maker of the present invention.

Referring to the drawings there is shown in FIG. 1 an electric coffee percolator 11 which comprises an upright vessel 12 which has on one side thereof a handle 13 and a pouring spout 14 on the other side thereof. A suitable base 15 is secured to the bottom of the vessel with its side walls contoured to blend with the side walls of the vessel 12. In order to close the top opening in the vessel, a suitable cover 16 is provided which includes a handle portion 17 to facilitate removal of the cover from the vessel. The outer periphery of the cover 16 rests on an inner shoulder or ledge 18 formed in the vessel 12. The handle 13 is secured at the bottom by means of a suitable cement or adhesive, while the top is retained by a screw 19 which extends through the wall of the vessel 12 in threaded engagement with the upper end of the handle 13. When it is desired to pour liquid from the vessel 12, the vessel is tipped thereby permitting liquid to pass out of the spout 14 which is spaced from the cover 16.

The vessel 12 is a one piece molded plastic part which may be fabricated from any one of the suitable plastics. The vessel 12 has side walls 20 which are generally cylindrical in shape, although they are flared somewhat towards the top opening. At the lower end of the vessel 12, the side walls 20 engage the base 15 at an inclined surface 21 which abuts a sloped mating surface 22 on the vessel 12. The base 15 and the vessel 12, when they are secured together, form a base compartment 23, which is defined at its top by the bottom wall 24 of the vessel 12 and at its bottom by a closure member 25, which is secured to the base by means of a pair of screws 26. The screws 26 also secure the mounting bracket of the present invention to the base 15 in a manner which will subsequently be described.

Supported on the vessel bottom wall 24 is the heating assembly 27 which has an upwardly extending pump well 28, which extends through the circular aperture 29 in the bottom wall 24 of the vessel 12. The heating assembly 27 consists of a die-cast mass which is formed with a body section 31 and the pump well 28. The pump well 28 is formed with threads which receive a mounting nut 33 that retains the heating assembly 27 in placed beneath the bottom wall 24. Cast within the heating assembly 27 is a sheathed heating element 34, which includes two loops 35 and 36 that are positioned within the body section 31, as is conventional. The heating element 34 consists of an outer protective sheath 39 within which is mounted an elongated helical coil resistance wire 40 which, in turn, is spaced from the sheath 39 by means of a packed insulating powder (not shown) such as magnesium oxide. The resistance wire 40 is connected to the live voltage through the terminals 42 which protrude from the base 15 of the coffee maker by means of electrical connectors 41. A laid-in keep-warm heater 46 is also provided in the heater assembly 27.

In order to provide a seal for the central aperture 29 and to insulate the heating assembly 27 from the bottom wall 24 of the vessel 12 a pair of resilient sealing washers 43, 44 are provided. The sealing washers 43, 44 overlie the central aperture 29 on the top and bottom of the wall 24, respectively, and they have a portion that extends into the aperture 29 so that they meet at the middle of the aperture 29, thereby forming a tight seal around the aperture 29 and the pump well 28. A metallic ring 45, which has a downwardly extending lip for receiving the sealing washer 43, is inserted between the nut 33 and the washer 43 so as to equalize the stress distribution that results when the nut 33 is tightened thereby avoiding cracking and galling of the bottom wall 20 of the vessel 12.

In order to control the energization of the heating elements 34 and 46, there is provided a conventional control thermostat 47 which consists of a bimetallic switch that responds to the temperature that is applied to the sensing button 48 of aluminum or other heat-conducting material. The sensing button 48 extends upwardly through an aperture 49 in the bottom wall 24 of the vessel 12 and is treadably secured to a heat transfer member 63 that contacts the upper surface of the thermostat 47. The aperture 49 in the bottom wall 24 of the vessel 12 for the sensing button 48 is sealed against leakage by a pair of washers 50 and 51 on the top and bottom faces, respectively, of the wall 24.

Figure 2:
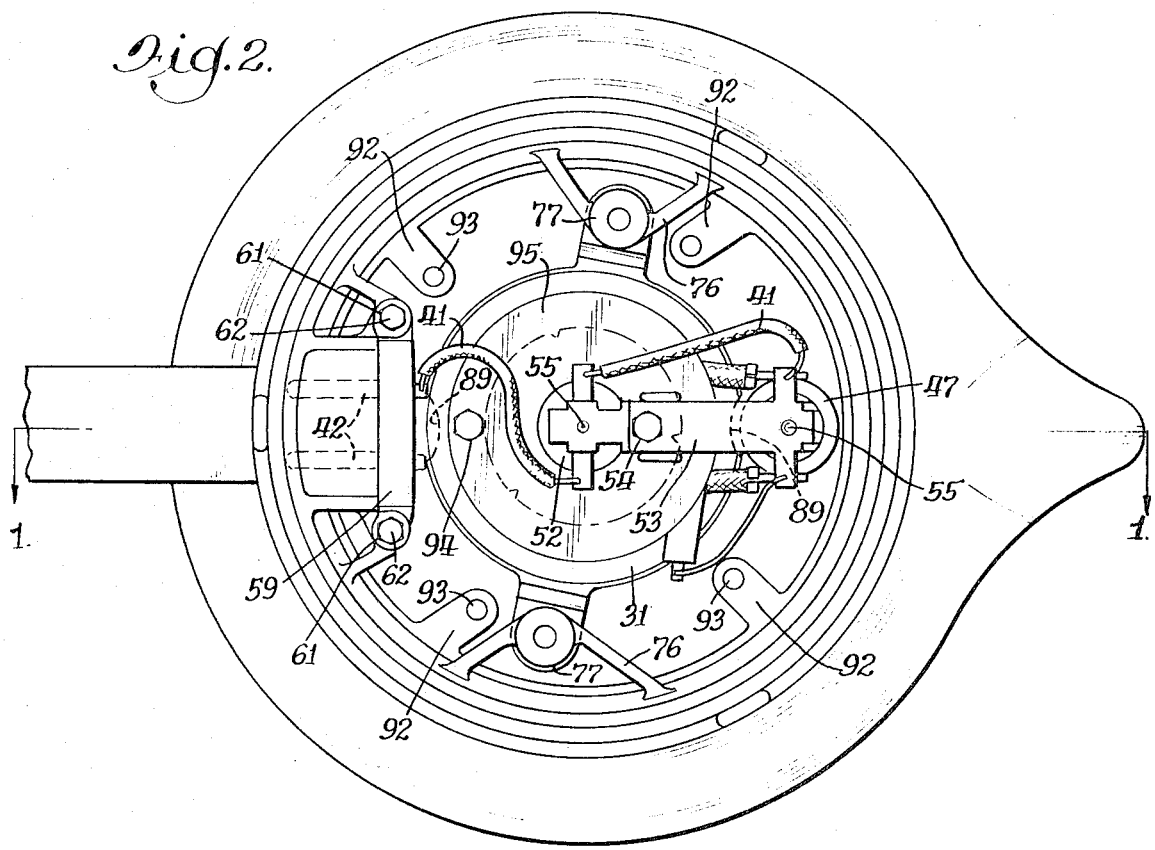
FIG. 2 is a bottom view of the coffee maker of FIG. 1 with the bottom closure plate removed.

As is shown in FIG. 2, a safety thermostat 52 is attached to the body section 31 of the heater assembly 27. A shallow cylindrical recess is provided in the bottom of the body section 31 to receive a portion of the safety thermostat 52. In order to retain the control thermostat 47 and the safety thermostat 52 in assembled relationship to the vessel 12 and the heater assembly 27, an elongated bracket 53 is secured to the body section 31 by means of an assembly bolt 54. The bracket 53 is provided with small spherical dimples 55 which engages the rear face of the thermostats 47 and 52 to insure the proper engagement of the thermostats against the vessel 12 and the heater assembly 27. The dimples 55 result in the retaining force of the bracket 53 being applied against the thermostats 47 and 52 in an axial direction and perpendicular to the surfaces they engaged in spite of any minor twisting of the bracket 53 or of any uneveness in the area of the body section 31 to which the bracket 53 is assembled.

In order to supply power to the electric coffee maker 11, a suitable power cord is provided which connects to the terminal pins 42 which are mounted in spaced parallel relation in a recess 59 that is formed in a base 15. The pins 42 are mounted on a support member 59 which is secured within the base compartment 23, adjacent to the walls that form the recess 60, by means of the bolts 61 which extend through openings in the support member into threaded engagement with the nuts 62. Suitable retaining nuts 63 are threadably received on the threaded inner ends of the terminal pins 42 to retain the terminal pins 42 in assembled relationship with the support member 59.

The thermostat 47 is made so that it opens the heating element circulated at a predetermined water temperature, usually somewhere close to the boiling point of water or on the order of 200° F. Because of the thermal lag in response at the thermostat location, the thermostat 47 is usually designed to actually open at about 175° to achieve the desired water temperature. The safety thermostat 52 on the other hand, is generally manufactured so that it will open automatically at approximately 300° F in response to an overheat condition which would otherwise damage the plastic vessel 12. The safety thermostat 52 normally does not function except in instances when the vessel 12 is empty and there is no liquid contained therein. In such a case, the insulating character of the bottom wall 24 is such that the heating assembly 27 could heat to dangerously high temperature without causing the control thermostat 47 to open. The safety thermostat 52 is, however, in good heat transfer relationship with the heating assembly 27 in the nested recess of the body section 31. As a consequence the safety thermostat 52 responds promptly as the temperature of the heating assembly 27 rises. It is extremely important that the safety thermostat 52 respond quickly since with the liquid removed from the vessel 12 the heating assembly 27 will have a tendency to rise to a high temperature very rapidly.

Figure 4:
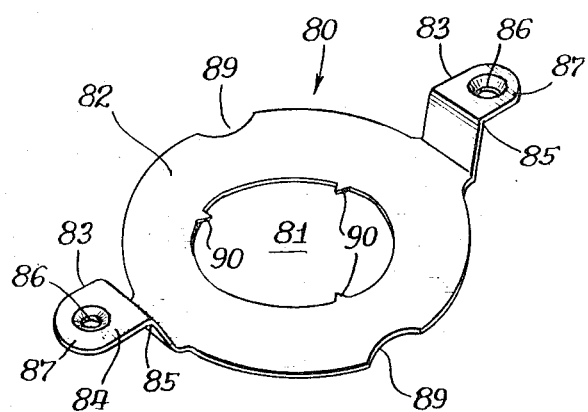
FIG. 4 is a perspective view of the bottom of the mounting bracket of the present invention.
Figure 3:
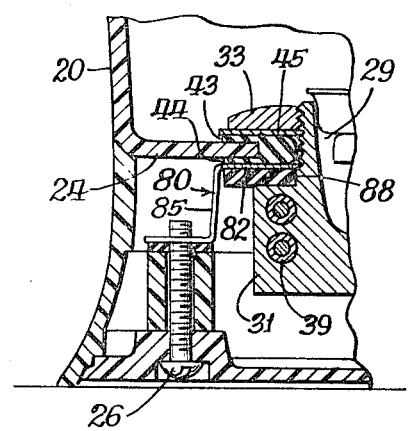
FIG. 3 is an enlarged fragmentary sectional view taken substantially along the line 3—3 of FIG. 1.

A metallic mounting bracket 80 is provided which has circular shaped center section 82 that has a central aperture 81 which fits over the threaded portion of the pump well 28. FIG. 4 is a perspective view of the bottom of the bracket 80 and FIG. 3 shows the manner in which the bracket 80 is secured to the base 15. A pair of resilient mounting arms 83 extent outwardly from the circular central section 82. The resilient mounting arms 83 have surfaces 84 which are substantially parallel to the surface of the central section 82, but they are at a lower level due to the bends 85. The arms 83 also have holes 86 therein which are formed with helically-shaped locking ramps 87 that are formed integrally from the arms 83.

The base 15 is provided with integrally molded webs 76 which connect the cylindrical side walls of the base to the tubular members 77. On the inner cylindrical walls of the base 15 there are a plurality of integrally molded support bases 92, each of which have an integral upwardly extending post 93 on its inner end. The upwardly extending posts 93 are of a length such that the bottom wall 24 of the vessel 12 will be supported on the upper surfaces of the posts 93 when the vessel 12 is secured in place on the base 15. The screws 26 project through the base closure member 25 to hold it against the base and they also project upwardly through the tubular members 77. The surfaces 84 of the arms 83 contact the upper surfaces of the tubular members 77 and the screws 26 thereby not only secure the closure member 25 to the base 15, but they also secure the bracket 80 to the base 15. A relatively thick and stiff washer 88 of heat-insulating material surrounds the pump well 28 between the bracket 80 and the body section 31 of the heating assembly 27. When the locking nut 83 is tightened the bracket 80 will be secured into place against the sealing washer 44 that is on the bottom face of the bottom wall 24 of the vessel 12.

The bracket 80 and the sealing washer are formed with cut-out sections 89 on opposite sides of the periphery of the central section 82 which conform to an overlapping peripheral portion of the outer surface of the control thermostat 47. Two cut-out sections are provided on the bracket 80 instead of only one so that the bracket 80 may be assembled on the pump well 28 with the arms 83 placed in either direction. The relatively large inner aperture 81 of the bracket 80 is formed with a plurality of inwardly extending triangular projections 90. The projections 90 serve to provide limited amount of interference with the threaded section of the pump well 28, thereby providing for a somewhat closer fit of the bracket 80 and the threaded section of the pump well 28 while at the same time allowing the aperture 81 to be sufficiently large that it will not easily become locked upon the threaded section of the pump well 28 when the bracket 80 is being removed or is being inserted over the pump well 28.

The coffee basket 68 for receiving coffee grounds is supported inside of the rim 69 of the cover 16 on top of the fountain 70 by means of circular lip 71 on the upper portion of the fountain tube 70. The lower end of the fountain tube 70 has a cup-shaped disc section 72 with apertures therein and a valve disc 74 which extends into the pump well 28 to accomplish percolation in the conventional manner. The heated water flows up through the fountain tube 70 into the coffee basket 68 and since the coffee basket 68 has a perforated bottom, the heated coffee liquid then flows down through the coffee grounds in the coffee basket 68 to be collected in the vessel 12.

From the foregoing description it will be obvious that there has been provided a simple and efficient means of mounting a plastic base to a plastic heating vessel that has a plastic bottom wall in which molded-in stresses of the plastic vessel are minimized while the heat on the bottom wall of the plastic vessel may simultaneously be more evenly distributed.

While there has been shown and described a particular embodiment of the present invention, it will be apparent to those skilled in the art that various changes and modifications may be made without departing from the invention in its broader aspects. It is, therefore, contemplated in the appended claims to cover all such changes and modifications which fall within the true scope of the present invention. In particular it is noted that the securing means of the present invention is not limited to a percolator type of liquid heating vessel, but that it is equally applicable to electric heating vessels of various types, including the type in which the heating assembly extends through the bottom of the vessel into direct contact with the liquid in the plastic vessel.

What is claimed as new and desired to be secured by Letters Patent of the United States is:

1. An electrical liquid heating appliance comprising a plastic heating vessel having a plastic bottom wall with a central aperture therein, a base upon which said heating vessel rests, said base and said bottom wall forming a base enclosure, an electric heating assembly in said base enclosure having a threaded portion which extends upwardly through said central aperture into contact with the liquid in said upper vessel, first securing means cooperating with said threaded portion for compressibly forcing said heating assembly upwardly against said bottom wall to secure said heating assembly below said bottom wall, a metallic bracket having a section with a central aperture therein which encircles at least a part of said threaded portion of said heating assembly between said bottom wall and said heating assembly and a plurality of mounting arms which extends outwardly from said section, said section of said bracket being forced upwardly to a secured position between said bottom wall and said heating assembly by said securing means, and second securing means for securing said mounting arms to said base.

2. An electrical liquid heating appliance as set forth in claim 1 wherein said bracket has a plurality of triangular-shaped projections which project inwardly in said central aperture towards said threaded portion of said heating assembly.

3. An electrical liquid heating appliance as set forth in claim 1 wherein said mounting arms have mounting apertures therein which have screw-securing surfaces integrally associated therewith and said second securing means are screws.

4. An electrical liquid heating appliance as set forth in claim 1 further comprising a control thermostat means mounted on the bottom wall at a location remote from said heating assembly wherein said bracket has a cut-out section on its periphery which corresponds in shape to an overlapping peripheral portional of said thermostat means.

5. An electrical liquid heating appliance as set forth in claim 1 wherein said base comprises a base closure plate wherein said second securing means secures said closure plate to said base in addition to securing said base to said bracket.

6. An electrical liquid heating appliance as set forth in claim 1 wherein said base is formed of plastic and said base comprises a plurality of integrally molded web structures each of which includes a tubular member with an upwardly extending axis and said second securing means comprises a plurality of mounting screws each of which passes through one of said tubular members into threaded engagement with a screw-securing surface that is integrally formed with said bracket and is associated with a mounting aperture located in one of said mounting arms of said bracket.

7. An electrical liquid heating appliance as set forth in claim 6 wherein said base comprises a base closure plate wherein said second securing means secures said closure plate to said base in addition to securing said base to said bracket.

8. An electrical liquid heating appliance as set forth in claim 1 wherein said base is formed of plastic and comprises a plurality of integrally formed upstanding posts the upper surfaces of which abut said bottom wall of said heating vessel so as to assist in supporting said heating vessel on said base.

9. An electrical liquid heating appliance as set forth in claim 1 comprising a washer of thermally-insulating material interposed between said bracket and said heating assembly.

10. An electrical liquid heating appliance as set forth in claim 1 comprising thermal-insulating means for thermally insulating said heating assembly from said plastic bottom wall of said plastic heating vessel.

* * * * *

UNITED STATES PATENT OFFICE
CERTIFICATE OF CORRECTION

Patent No. 3,725,642     Dated  April 3, 1973

Inventor(s)  Jack E. Weidner

It is certified that error appears in the above-identified patent and that said Letters Patent are hereby corrected as shown below:

In the Abstract, line 5, before "threaded" insert -- The --; line 7, delete "p" before "plastic"; line 7, after "plastic" insert -- base --; line 11, delete "surrounds"; line 11, before "upperwardly" insert -- the --; line 11, after "upperwardly" delete "upwardly"; line 11, before "pump" insert -- projecting --.

Signed and sealed this 20th day of November 1973.

(SEAL)
Attest:

EDWARD M.FLETCHER,JR.
Attesting Officer

RENE D. TEGTMEYER
Acting Commissioner of Patents